United States Patent Office 2,759,360
Patented Aug. 21, 1956

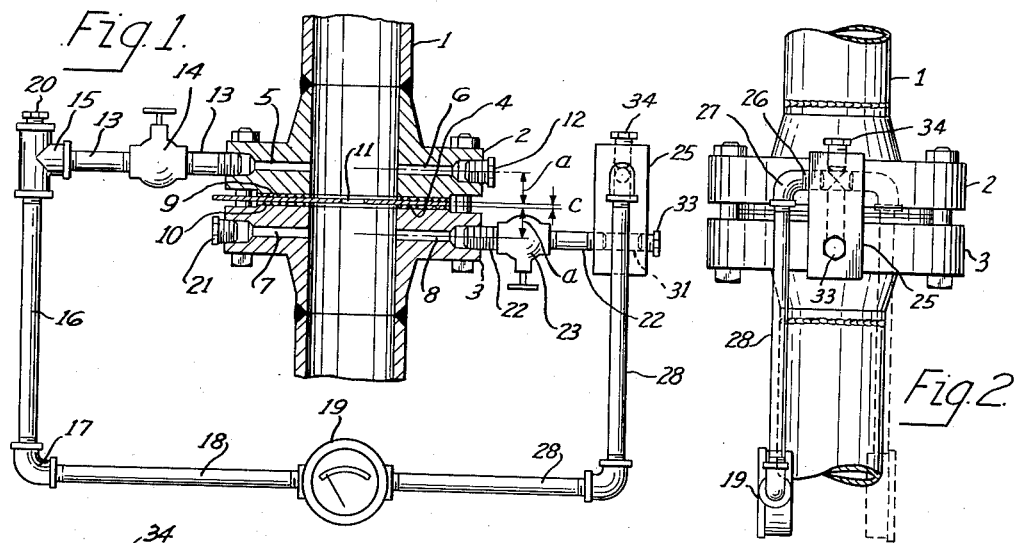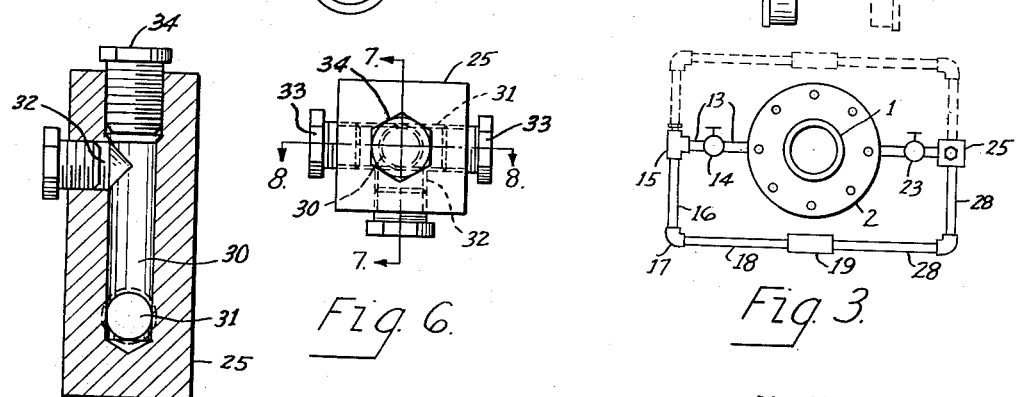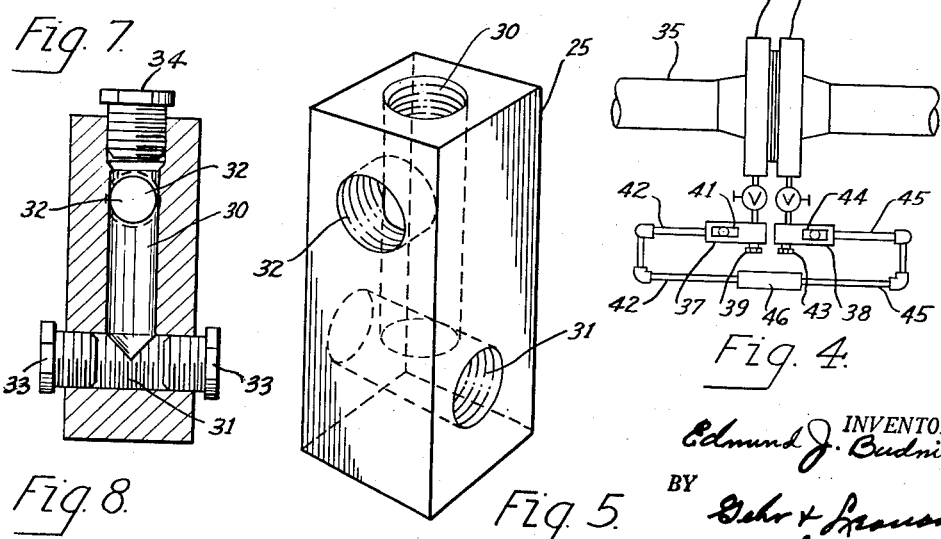

2,759,360

STATIC HEAD COMPENSATOR FOR ORIFICE PLATE COMPANION FLANGES

Edmund J. Budnick, Bay Village, Ohio

Application June 28, 1952, Serial No. 296,225

5 Claims. (Cl. 73—211)

This invention relates to a static head compensator and to a combination with upper and lower companion orifice flanges and an orifice plate of a static head compensator arranged to provide for an increase of the static head at the take-off duct or tap of the lower companion flange so that the static fluid pressures applied from the take-off ducts of the companion flanges at opposite sides of the orifice plate to a differential fluid pressure operated meter are equalized.

As is well known in the art, a common means for the measuring of the flow of fluids and liquids through pipe lines is a so-called orifice plate. In general, the pipe line in which such fluids are to be measured is arranged with its axis vertical. In the installation of orifice plates of flow meters, the common practice is to provide in the pipe line upper and lower companion flanges each of which is arranged in coaxial relation to the pipe line at the point of installation and each of which preferably has a passage of the same internal diameter as the pipe line. The orifice plate is clamped between the flanges in coaxial relation to the passage through the flanges, suitable gaskets being provided at the upper and lower faces of the plate so as to form a sealed connection between the flanges and the orifice plate.

Such flanges are provided with radial ducts, the usual practice being to provide in each flange ducts which are diametrically opposite to each other and coaxial. The ducts of each flange extend preferably at right angles to the axis to the passage through the flange so that, in effect, a straight-through diametral duct is afforded. These ducts are commonly referred to as take-off taps or ducts and are arranged precisely at a predetermined distance from the face of the flange against which the orifice plate is to be clamped.

In the conventional installation, the axis of the ducts of the upper companion flange is exactly 1″ above the upper or upper-stream face of the orifice plate when the orifice plate is clamped between the flanges with the appropriate gaskets interposed. The axis of take-off ducts of the lower flange is exactly 1″ below the down-stream face of the orifice plate with the gaskets installed. The orifice plate generally is 1/8″ thick so that the axes of the upper ducts are at a level exactly 2 1/8″ vertically above the axes of the lower ducts. Some variations in these dimensions are permitted for different sizes of pipe lines, the differences arising largely by virtue of different thicknesses of orifice plates for different diameters of pipes.

In all such installations, one of the radial ducts of each flange is plugged at one of its outer ends by a removable plug so that a straight-through clean-out passage is provided.

Suitable pipes are connected to the unplugged outer ends of ducts of the flanges respectively, and lead to opposite sides of a differential pressure gauge which may be any of the usual types. The type of flow meter most commonly used is one employing a diaphragm which segregates the liquids or fluids applied to opposite sides so that there is very little movement in the pipes leading from the take-off ducts.

The 2 1/8″ differential between the point of take-off to the gauge from the two flanges induces a static head which, of course, is reflected in the operation of the gauge. Compensation on the gauge dial for this differential in the heads is impractical for a number of reasons, the most important of which is that the ratio of the static head differential to the differential in the dynamic head is inconstant. For example, when the flow through the orifice plate is very small, the static head differential is very large in proportion to the dynamic head differential at opposite sides of the plate. On the other hand, when there is a large flow through the orifice plate, the dynamic head differential is so great that the small constant static head becomes a negligible portion of the total differential pressure head. In order to compensate for the static head differential, the prior practice has been to provide ordinary pipe fittings leading from the ducts of the companion flanges to opposite sides of the gauge. Generally, the connections require the usual standard pipe elbows, nipples, and the like. Such pipe elements are not threaded to accurate depth and often are somewhat inaccurate in dimension. Accordingly, when the installation is made the riser pipe from the lower take-off duct does not bring the axis of the highest point of the take-off pipe thereof precisely to the level of the axis of the take-off pipe of the upper take-off duct. On the other hand, unless the pipe connections, elbows and nipples are screwed into the full depth, a tight joint is not provided. Generally, therefore, the installation is made as close as may be with the fittings on hand and then the lead-off pipes from the take-off ducts are heated and bent to bring the axis of the highest take-off points of the upper and lower ducts to the same level. Such operations are require the service of at least three men, a pipe fitter, a welder, and an engineer are required. In order to obtain the adjustment, the pipe line is closed, the lead off pipes to the gauge are heated and bent, allowed to cool, then tested for leaks. The pipe is then refilled and the meter checked for static head. If compensation has not been made, the procedure must be repeated until the engineer has determined that the static head is properly compensated.

Frequently during the bending, heating and cooling, joints become loosened, requiring further servicing of the pipe fitter with the repetition of the previous adjustments. The same is true in those cases in which the meter subsequently may be thrown out of adjustment due to the pipes being struck by a workman in the shop and the like.

In accordance with the present invention, the compensator is one which is arranged to be installed by the ordinary pipe fitter and which, when installed, exactly compensates for the static head differential between the take-off ducts of the particular companion flanges and orifice plate combination.

Further, the compensator is so arranged that adequate provision is made for cleaning out of the take-off ducts of the flanges without in any way disturbing the fitting between the gauge lead-off pipe of the compensator and flanges. Provision is also made for the installation of pressure gages in those instances in which both the flow of fluid and the pressure on the upstream and downstream sides of the orifice plate are necessary for determining the volume of flow. The present compensator also has its advantages in connection with horizontal pipe lines in which an orifice plate is installed.

The objects and advantages of the present invention will become apparent from the following description wherein reference is made to the drawings in which:

Figure 1 is a front elevation of a portion of a pipe line, companion flanges, and orifice plate combination with the device of the present invention installed, the pipe line and flanges being shown in section for clearness and illustration;

Figures 2 and 3 are respectively, a right hand elevation and top plan view of the structure illustrated in Figure 1;

Figure 4 is a top plan view of a horizontal pipe line employing companion flanges and an orifice plate, showing the application of the compensator of the present invention to such an installation;

Figure 5 is a perspective view of a preferred form of compensator embodying the principles of the present invention;

Figure 6 is a top plan view, on reduced scale, of the compensator illustrated in Figure 5; and Figures 7 and 8 are vertical, cross-sectional views of the compensator taken on the planes indicated by the lines 7—7 and 8—8 of Figure 6.

For convenience in description, the compensator will be described first in connection with the installations such as shown in Figure 1 in which the pipe line is vertical, the relative position of the parts being readily apparent therefrom regardless of any other position of the pipe line in which the compensator may be installed.

Referring first to Figures 1 through 3, the compensator is shown in connection with the upright pipe line, indicated generally at 1, which is provided with upper and lower standard companion flanges 2 and 3, respectively, between which is mounted an orifice plate 4. The upper companion flange is provided with transverse or take-off ducts 5 and 6, respectively, which extend from the central passage of the flange radially to the outer peripheral wall of the flange. The ducts 5 and 6 are open at their outer ends and are coaxial, providing, in effect, a diametral straight-through duct. Correspondingly, the lower companion flange 3 is provided with ducts 7 and 8 similarly arranged.

Interposed between the orifice plate 4 and the flanges 2 and 3 are suitable sealing gaskets 9 and 10, respectively. The orifice plate 4 is provided with a metering orifice 11 which, when the orifice plate is installed, is in coaxial relation with the flanges 2 and 3. In such installations, the take-off ducts of the flanges are positioned at precise distances above and below the upper and lower faces of the orifice plate 4, respectively.

The take-off ducts 5 and 6 have their common axis at a distance $a$ above the upstream face of the orifice plate and the ducts 7 and 8 have their common axis the same distance $a$ below the downstream face of the orifice plate. Ordinarily the gaskets, which are shown in exaggerated thickness in the drawing, add very little to the distance between the faces of the plate and the respective ducts. The plate 4 is of a definite thickness $c$ for given diameter of companion flanges. For most installations the distance $a$ is exactly 1" and the thickness of the orifice plate is 1/8" for pipes of the size most generally used, but for very large distance pipes, the orifice plate may be as much as 1/4" thick.

The compensator of the present invention may be made in a number of different standard sizes, corresponding to the standard companion flanges and the orifice plate to be used therewith.

As mentioned, the ducts 5 and 6 are coaxial as also are the ducts 7 and 8. The purpose of the coaxial ducts is to provide a straight-through passage in each flange for clean-out of the ducts without disturbing the connection between the take-off pipes leading from the main pipe line and to the meter, respectively.

As is customary in such instances, the axes of the ducts 5 through 8 are horizontal. The outer end of one duct of each companion flange is plugged by a readily detachable plug. In the form illustrated, the outer end of the duct 6 is plugged by a suitable screw plug 12. Connected to the outer end of the duct 5 is a meter take-off pipe 13. Thus, in the form illustrated, the outer end of each duct is provided with enlarged bores which are internally threaded. The take-off pipe 13 leads from the outer end of the duct 5 to a suitable straight-through valve 14 which in turn leads to a standard T-fitting 15. A lead pipe 16 extends from the bottom of the fitting 15 and, through a right angle elbow 17, is connected to a take-off pipe 18 which leads to one side of a differential gauge 19. The gauge is preferably, but not necessarily, of the diaphragm operated type.

The T-fitting 15 is provided at its upper end with a suitable removable plug 20 so as to afford access to the meter take-off line for cleaning and also for filling the take-off line up to the level of the line 13 with operating fluid, such as may be required for the particular installation. Quite frequently, the fluid used will be a non-freezing fluid or oil.

The ducts 7 and 8 of the lower companion flange are correspondingly arranged and fitted with a plug and gauge take-off line. Usually, the take-off line extends in the opposite direction from that leading from the duct of the upper companion flange. Thus, in the illustrative example, the open end of the duct 7 is sealed by a suitable removable plug 21 and a take-off line 22 is connected to the outer end of the duct 8. The line 22 is provided with a suitable straight through valve 23 corresponding to the valve 14.

The line 22 is connected to the compensator 25 of the present invention and a horizontal take-off pipe 26 leads from the compensator through an elbow 27 and extension 28 to the opposite side of the gauge 19.

The compensator of the present invention is so arranged that the axis of the take-off pipe 26 is horizontal and intersects the common horizontal axis, extended, of the ducts 5 and 6 so that there is added to the corresponding side of the meter a sufficient static head to compensate for the difference in static head between the duct 5 and the duct 8 resulting from their different elevations.

Referring to the compensator 25, a preferred form thereof is illustrated in Figures 5 through 8. In the form illustrated, the compensator comprises a solid body, preferably a block of metal, having an upright or axial bore 30 which is open through the top of the body and extends downwardly near to the lower end where it intersects a transverse bore 31, the axis of the bore 31 being at 90° to the axis of the bore 30. The bore 31 extends entirely through the body as a straight passage and is open and tapped at both ends. Between the upper end of the bore 30 and the upper limit of the bore 31, the body is provided with a secondary transverse bore 32, the axis of which extends at right angles to the axis of the bore 30. The axis of the bore 32, peripherally of the body, is disposed at 90° to the axis of the bore 31. The open ends of the bores, respectively, are arranged for connection either to a suitable pipe fitting or to a sealing plug. In the form illustrated, such a connection is provided by means of internal threads extending from the outer ends of the bores of the ducts a substantial distance inwardly of the body.

The difference in the level of the axes of the bores 31 and 32 is equal to the difference in elevation between the axes of the ducts 5 and 8 when the companion flanges 2 and 3 are in operating position at opposite sides of the orifice plate 4 with the compensator installed.

Since the axes of the bores 31 and 32 are in parallel planes it is apparent that if the bore 31 is connected to a pipe extending horizontally from the bore 8, the axis of the bore 32 will be exactly at the same elevation or level as the axis to the bore 5. Accordingly, the compensator is installed by connecting the pipe 22 to the body at one end of the bore 31 in coaxial relation with the bore 31, the compensator and pipe being screwed together until they are in tight fitting engagement and the compensator is substantially upright.

The take-off pipe 26 is connected to the body at the open end of the bore 32 in coaxial relation to the bore 32. Consequently the axis of the pipe 26 is the proper distance above the axis to the bore 31.

The opposite end of the bore 31 is closed by means of a suitable plug 33 and the open upper end of the bore 30 is closed by a suitable plug 34.

The bore 32 is preferably spaced below the upper end of the body a distance such that when the plug 34 is fully installed in the bore 30, the bottom of the plug is substantially at the uppermost limit of the circumferential wall of the bore 32. With the device thus installed, a through cleanout passage from one end of the duct 7 to the opposite end of the duct 8, through the valve 23, the interfitting pipe 22, and compensator bore 31 is provided.

In the event it is desired to use a liquid other than water in the compensator and lead-off pipes, such can be introduced by removing the plug 34 and filling the compensator to a point such above the upper limit of the bore 32.

Thus in Figure 1, assuming liquid is flowing in pipe line 1, the static head effective on the left hand side of the gauge 19 by way of the duct 5, pipes 13, 16 and 18 is equal to the pressure head in the pipe line 1 at the level of the duct 5 plus the column of liquid of a height equal to the distance of the duct 5 above the gauge 19.

The pressure head effective on the right hand side of the gauge 19 by way of the duct 8, pipe 22, compensator 25 and pipe 28 is equal to the static head in the pipe line 1 at the level of the duct 5 plus a column of liquid in the pipe of a height equal $2a+c$ which is the distance that duct 8 is below the level of the duct 5, minus a column in the compensator of a height $2a+c$ (since ducts 31 and 32 are spaced apart exactly $2a+c$ by construction) plus a column of liquid in pipe 28 equal to the distance of the duct 5 above the gauge 19 (since by design the duct 31 and duct 32 are arranged so that duct 32 is exactly at the elevation of duct 5).

Thus the column of fluid in the pipe line 1 between the level of the ducts 5 and 8 is neutralized by an equal column in the compensator, leaving the line 28 filled at the same level as the line 16. Thus the static heads in the two lines are equal and the gauge 19 is subjected to equalized static heads at its opposite sides.

If gaseous media are passing through the line 1, when the pipes 16 and 28 are filled with liquid at the level of the duct 5 but the duct 5 and line 13 and the duct 8 and line 22 and central bore 30 of the compensator are filled only with gaseous media. Thus the static heads on the opposite sides of the gauge 19 are balanced.

It will be apparent from the foregoing description that when the compensator is thus installed, each side of the meter is subjected to exactly the same static head inasmuch as the take-off points of the highest points in pipe lines leading to the meter are brought substantially to the same level.

In the form illustrated, the meter is arranged forwardly of the main pipe line in which case the bore 32 opens forwardly. If the meter installation is such that the meter to be installed on the opposite side of the main pipe line from that shown in Figure 1, then as indicated by the dotted line in Figure 2, the same compensator can be used merely by removing the plug 33 and securing that end of the bore 31 to the pipe 22 and plugging the opposite end of the bore 31, the compensator being rotated 180° about its axis for reinstallation in the new position.

In some instances it is desirable to use the compensator in a horizontal pipe line. Such a line is illustrated in Figure 4 and includes the pipe line 35 which is provided with companion flanges 36 and 36a, such as heretofore described. The axis of the pipe 35 and, correspondingly, the axes of the companion flanges and the orifice plate are horizontal. In this installation, two of the compensators such as hereinbefore described are used, one being indicated at 37 and the other at 38. In such installations, the companion flanges are arranged in a rotated position about the axis of the pipe line such that the take-off ducts are horizontal. The transverse bore of the compensator 37, corresponding to the bore 31, is connected at one end to one of the take-off ducts and has its other end sealed by a suitable plug 39. The compensator is positioned with the upper bore, corresponding to the bore 32 of the compensator 25, open upwardly so that it can be connected by a pipe fitting 40 to a suitable pressure gauge 41. In this installation the compensator is disposed with the axis of its longitudinal bore, corresponding to the bore 30 of the compensator 25 horizontal. The take-off line, indicated at 42, to one side of the gauge is connected to the longitudinal bore. The compensator 38 is identical with the compensator 37 and correspondingly installed except that its longitudinal bore opens in the opposite direction from the orifice plates from the longitudinal bore of the compensator 37. Correspondingly a plug 43 is used for sealing one end of the transverse bore.

A pressure guage 44 is connected with the upper bore, corresponding to the bore 32, of the compensator 25. The longitudinal bore is connected by pipe 45 to the opposite side of the guage, which is indicated at 46.

This installation has the advantages in that the transverse bore of each compensator provides for the straight through clean-out passage of the ducts of the companion flanges.

Furthermore, it provides for the installation of pressure guages at substantially identical elevations.

It is apparent from the foregoing description that the compensator described has a number of applications in which advantageous operation is obtained. While a preferred embodiment of the invention is shown in the drawings, the invention is not to be limited to the form illustrated as various modifications may be made therein without departing from the spirit of the invention.

Having thus described my invention, I claim:

1. In combination, an orifice plate, upper and lower companion orifice flanges each having an upright axial bore and a radial duct of which the axis is at right angles to the axis of the bore, each of said ducts being open at its outer end and communicating at its inner end with the axial bore of its flange, means clamping the flanges together in coaxial alignment with the orifice plate therebetween, the duct of the upper flange being adapted for connection to a pipe line for one side of a differential pressure gauge, a static head compensator including an upright rigid body having a generally upright passage therein, and having an upper horizontal bore and a lower horizontal bore, each of said horizontal bores being connected with the upright bore and being open at its outer end, said upper bore being adapted for connection to a pipe line for the other side of the differential pressure gauge, a horizontal pipe connecting the duct of the lower flange with the lower horizontal bore, and the axes of the upper and lower bores lying in horizontal planes spaced a vertical distance apart equal to the vertical distance between horizontal planes through the axes of the ducts, whereby the static head on the upper duct and upper bore are equal and compensate for the differential in static head between the upper and lower ducts.

2. The combination according to claim 1 characterized in that said lower horizontal bore extends entirely through the body and is open at both ends, and a readily detachable plug is secured to the body in sealing relation to that outer end of said lower horizontal bore opposite the end connected with the duct of the lower flange.

3. The combination according to claim 1 characterized in that the axis of the upper horizontal bore is offset, peripherally of the body, a right angle from the axis of the lower horizontal bore.

4. The combination according to claim 1 characterized in that the upright passage in the body extends above the level of the outer end of the upper horizontal bore and is open at its upper end through the top wall of the body, and a readily detachable plug is detachably secured to the body in sealing relation to the upper end of the passage.

5. The combination according to claim 1 characterized in the said upright passage and said bores are of equal and uniform diameter.

References Cited in the file of this patent

UNITED STATES PATENTS

| | | |
|---|---|---|
| 770,539 | Ryan | Sept. 20 1904 |
| 874,667 | Gehre | Dec. 24, 1907 |
| 1,181,749 | Dodge | May 2, 1916 |
| 1,220,168 | Baker | Mar. 27, 1917 |
| 1,740,902 | Murphy | Dec. 24, 1929 |
| 2,052,421 | Phelps | Aug. 25, 1936 |
| 2,326,884 | Phelps | Aug. 17, 1943 |
| 2,579 656 | Douglas et al. | Dec. 25, 1951 |

OTHER REFERENCES

A publication entitled Solving Difficult Fluid Measuring Problems found in "Instrumentation," vol. 4, 3rd. Quarter 1949, No. 2 pages 21–25.